US011373501B1

(12) United States Patent
Houser

(10) Patent No.: US 11,373,501 B1
(45) Date of Patent: Jun. 28, 2022

(54) SNOOZE ALERT SYSTEM AND METHOD

(71) Applicant: Michael Houser, Medford, OR (US)

(72) Inventor: Michael Houser, Medford, OR (US)

( * ) Notice: Subject to any disclaimer, the term of this patent is extended or adjusted under 35 U.S.C. 154(b) by 0 days.

(21) Appl. No.: 16/282,242

(22) Filed: Feb. 21, 2019

Related U.S. Application Data

(60) Provisional application No. 62/633,497, filed on Feb. 21, 2018.

(51) Int. Cl.
| | | |
|---|---|---|
| *G08B 21/06* | (2006.01) | |
| *G08B 21/04* | (2006.01) | |
| *G06F 3/01* | (2006.01) | |
| *B60K 28/06* | (2006.01) | |

(52) U.S. Cl.
CPC .......... *G08B 21/06* (2013.01); *B60K 28/066* (2013.01); *G06F 3/015* (2013.01); *G08B 21/0423* (2013.01); *G08B 21/0453* (2013.01); *G06F 2203/011* (2013.01)

(58) Field of Classification Search
CPC .... A61B 5/0022; A61B 5/4809; G08B 21/06; B60W 50/16; H04W 12/0027; H04W 48/04; H04W 64/00; G01S 5/0027
See application file for complete search history.

(56) References Cited

U.S. PATENT DOCUMENTS

| | | | | |
|---|---|---|---|---|
| 6,497,658 | B2* | 12/2002 | Roizen | A61B 5/18 600/300 |
| 6,822,573 | B2* | 11/2004 | Basir | G08B 21/06 280/735 |
| 2011/0270117 | A1* | 11/2011 | Warwick | A61B 5/0476 600/544 |
| 2014/0308924 | A1 | 10/2014 | Prakash | |
| 2015/0079967 | A1 | 3/2015 | Mullins | |
| 2017/0238868 | A1* | 8/2017 | Kenyon | G16H 50/20 |
| 2017/0313190 | A1* | 11/2017 | Shimada | A61B 5/0022 |
| 2019/0117144 | A1* | 4/2019 | Carraro | A61B 5/6893 |

* cited by examiner

*Primary Examiner* — Mirza F Alam
(74) *Attorney, Agent, or Firm* — DLA Piper LLP (US)

(57) ABSTRACT

A snooze alert device, system and method monitor a user and alert the user if the user starts to fall asleep while operating a vehicle.

12 Claims, 2 Drawing Sheets

US 11,373,501 B1

SNOOZE ALERT SYSTEM AND METHOD

PRIORITY CLAIMS/RELATED APPLICATIONS

This application claims the benefit under 35 USC 119(e) to U.S. Provisional Patent Application Ser. No. 62/633,497 filed on Feb. 21, 2018 and entitled "Snooze Alert System and Method", the entirety of which is incorporated herein by reference.

FIELD

The disclosure relates generally to a device, system and method for detect a characteristic of sleep/dozing of an individual while driving a vehicle and alert that individual before an accident occurs.

BACKGROUND

Biometrics today do not have a function to wake a driver that may be falling asleep at the controls of a moving vehicle/plane/train/etc.

Health devices and monitors exist, such as heart rate monitors and breathing monitors such as the Fit Bit by Microsoft® or the Sleep program by Apple®. However, these devices and monitors do not have a function designed in such a way as to alert the host or warn the person of a catastrophic issue. While there are obviously also medical monitors in a hospital that may generate an alert in a patient in the hospital has an impending problem, such as low blood pressure or no heartbeat, none of these hospital medical monitors are appropriate for the device that may be sold to consumers are used to alert a user that the user is falling asleep and it is to this end that the disclosure is directed.

DETAILED DESCRIPTION OF ONE OR MORE EMBODIMENTS

The disclosure is particularly applicable to a falling asleep monitor for a person operating a vehicle like an automobile or truck and it is in this context that the disclosure will be described. It will be appreciated, however, that the falling asleep monitor device, system and method has greater utility since it can be used to detect a person falling asleep while operating various different types of vehicles or equipment including other vehicles, heavy machinery, aircraft and the like.

The snooze alert device, system and method may have many different functions although the below described embodiment's primary function is to alert a user if/when the user starts to fall asleep thus saving a life of the person by preventing the user from falling asleep while operating a vehicle or a piece of equipment. Thus, the goal of the Snooze Alert is to focus on the potential catastrophic act of falling asleep when conditions are dangerous to do so, but will not be limited to only this function. Future functions/variants that are within the scope of the disclosure may be a monitoring device, system and method that can detect heart attacks/choking/arrhythmia/stress/etc. and it is to this end that the disclosure is directed.

This monitoring system is designed to report on biological rhythms/characteristics of the host body (the body of the person being monitored). The device may be composed of a sensor, an application, and a transmitter (perhaps a Bluetooth headset and a cell phone with targeted applications in one embodiment) that monitors the characteristics of the user, determines that the user may be falling asleep based on the measured characteristics and alerts the user. In the embodiment with the headset, the headset can go into a listening mode for applications requiring cardiac monitoring & breathing and the cell phone can either decode and compute the rhythms and sounds, or open a line to a dedicated computer to monitor the functions.

Figure 1:
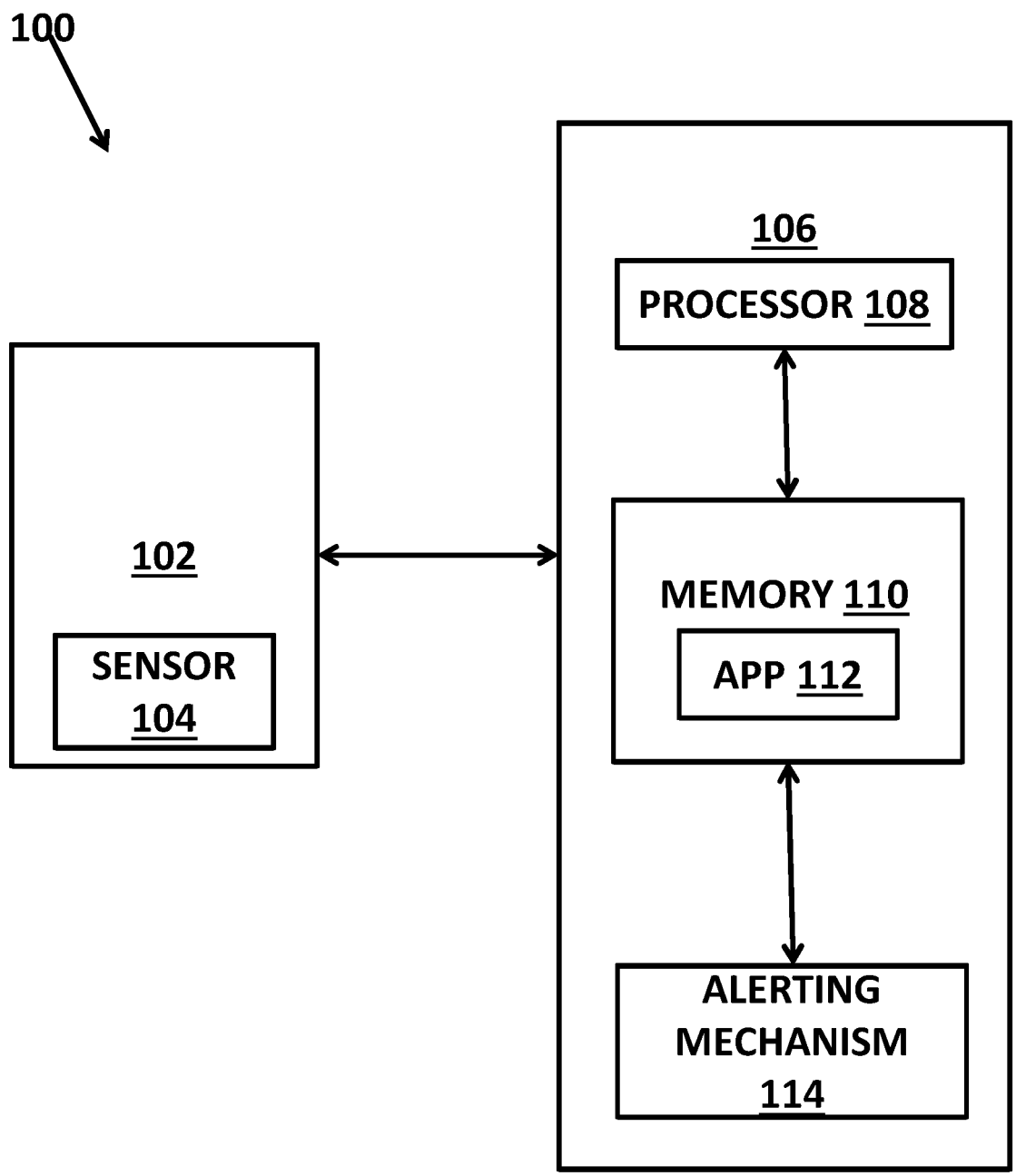
FIG. 1 illustrates an embodiment of a dozing/falling asleep monitoring system.

FIG. 1 illustrates an embodiment of a dozing/falling asleep monitoring system 100 that may include a peripheral device 102 and a computing device 106 that may be coupled to and communicate with the peripheral device over a communication path that may be a wired communication path or a wireless communication path. For example, the communication path may be a wire that connects the device 102 to the computing device 106 or the communication path may be a wireless connection, such as Bluetooth for example.

As shown in FIG. 1, one or more sensors 104 may be mounted to or integrated within the device 102. The device 102, for example may be a processing unit based device that may be already be in common use so that the monitoring device and system are practical for travelers and commercial drivers to use. For example, the device 102 may be a wireless headset or headphone device. The one or sensors 104 may be, for example, sensors that may be set to listen to the body of the user, such as monitoring heart rate (such as by using a known heart rate sensor) and/or breathing functions (such as by using an accelerometer that can measure the movement of the chest wall and thus breathing), to determine if a sleep pattern was approaching. The device 102 may have other sensors 104 such as a temperature sensor, a galvanic sensor, an Alpha & Beta brainwave sensor and/or FoU controls (Fountain of Youth).

The computing device 106 of the monitoring system 100 may be a processor based device that allows the computing device 106 to receive data/signals from the device 102 and/or sensors 104, determine if the data/signals shows a sleep pattern or that the user is falling asleep and generate an alarm to the user of the sleep pattern is detected. For example, the computing device 106 (or app 112) may receive the sleep pattern characteristic data, such as a heart rate of the driver, and determine that a sleep pattern is detected when the heart rate of the driver falls below a threshold heart rate, such as 70 beats per minute, for longer than a predetermined amount of time, such as 10 seconds. In other embodiments, some/all of the processing may be performed in the device 102. Furthermore, in some embodiments, the device 102 may be able to perform the detection of the sleep pattern and generate an alert to the user.

In the embodiment shown in FIG. 1, the computing device may include at least one processor 108, a memory (temporary or persistent) 110, a display and an alerting mechanism 114. For example, the computing device 106 may be a smartphone device, such as an Apple® iPhone or an Android® operating system based device, a cellular phone, a tablet computer and the like. The processor 108 may control the overall operation of the computing device 106 and the memory 110 may store data, an operating system and applications being executed by the processor 108. For example, in one embodiment, the memory may store an application 112 (mobile application, downloadable application, etc.) that performs the analysis of the data/signal from the sensor 104, determines if a sleep pattern is detected and causes the alerting mechanism 114 to generate the alarm to the user. The alerting mechanism 114 may be a device that generates an audible alarm/alert, such as sound, a visual alarm/alert, such as flashing lights or a full brightness screen of the computing device and/or a physical alarm/alert, such as a vibration.

In addition to the example of the monitoring system and device described above for monitoring sleep patterns, the system may be user to monitor sleep or fatigue, blood pressure, pulse, battlefield/business health or stress conditions and/or cardiac functions. The monitoring system may also be a credibility truth monitor or monitor stress on personnel in 3D modeled environment delineating hot spots.

In one embodiment, the device 102 may be a Bluetooth headset, such as a Plantronics Traveler headset, with the addition of a listening device for the sensor 104. For example, the speaker function mounted in the ear canal could be reversed to act as a microphone. Also, other sensors could be added at the points of contact or proximity with the host body of this device. The computing device 106 may be a basic cellular telephone that hosts a proprietary software application. The cell phone is capable of receiving the data stream being sent to it from the Bluetooth headset. The Software Application analyzes the data stream sent to the cell phone from the Bluetooth headset. This application computes potential issues using the computer function of the cell phone. If data arrives to the program that it cannot decipher it shall open a line to a dedicated server with greater function to analyze the data stream issue. When a dangerous or unknown issue arises an alert would sound to warn the host individual wearing the Bluetooth headset. If action is not taken, automated notifications may be sent out.

While the disclosure is particularly applicable to an alarm sounding, thus waking a person who may be falling asleep in an undesirable or dangerous situation and it is in this context that the disclosure will be described, it will be appreciated, however, that the Snooze Alert has greater utility, such as a stress detector, heart arrhythmia detector, battlefield situational monitor (could be modeled into a real time 3D graphic representation). The trickle down would also work in the business, sports or other environment do delineate programmed issues cropping up with designated personnel.

Figure 2:
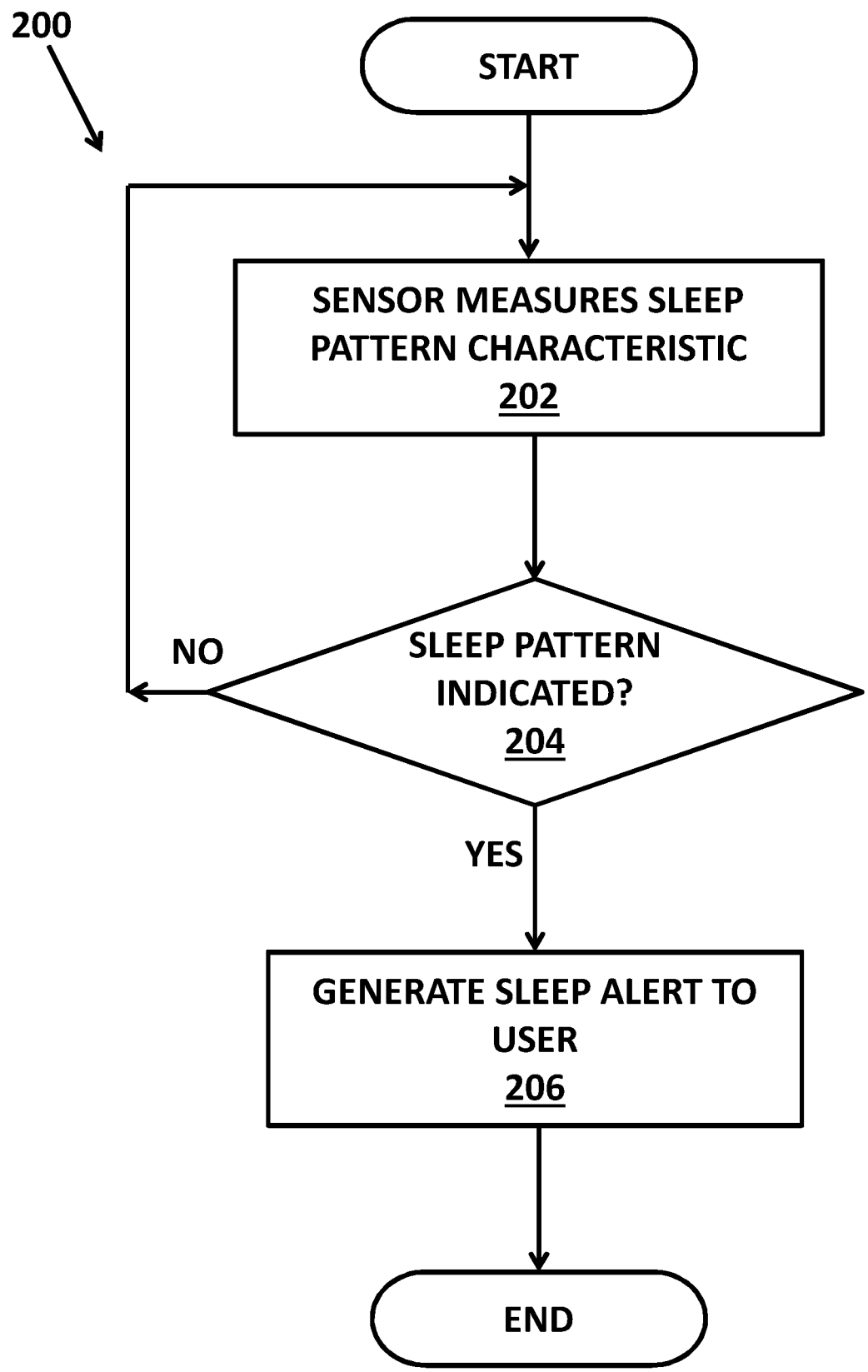
FIG. 2 illustrates a method for detecting a person falling asleep while operating a vehicle and alerting the person.

FIG. 2 illustrates a method 200 for detecting a person falling asleep while operating a vehicle and alerting the person. While the person is wearing the device or has the device on her/his body, the one or more sensors may monitor one or more characteristics of the user (202), such as to look for sleep pattern characteristics. Once the sensor(s) data/signals are received, it may be determined if a sleep pattern has been detected (204). If no sleep pattern is detected, newer data/signals from the sensors may be gathered and analyzed. If a sleep pattern is detected, an alert/alarm (206) may be generated to alert the user.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media.

Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A snooze alert device, comprising:
  a sleep pattern characteristic sensor adjacent to a driver that generates one or more pieces of sleep pattern characteristic data about the driver, the sleep pattern characteristic sensor further comprising a heart rate sensor and a breathing sensor that generate heart rate data and breathing data;
  a computing device connected to the sleep pattern characteristic sensor that receives the one or more pieces of sleep pattern characteristic data, analyzes the heart rate data and the breathing data to determine a sleep pattern of the driver and detects if the sleep pattern of the driver is indicated based on the sleep pattern characteristic data; and
  an alerting mechanism connected to the computing device that generates a sleep pattern alert when the sleep pattern of the driver is detected.

2. The device of claim 1, wherein the computing device further comprises an application executing by a processor of the computing device that receives the one or more pieces of sleep pattern characteristic data and detects if the sleep pattern of the driver is indicated.

3. The device of claim 2, wherein the sleep pattern characteristic sensor is one of mounted to or integrated into a snooze alert device that is in a vehicle.

4. The device of claim 3, wherein the sleep pattern characteristic sensor further comprises one of a temperature sensor, a galvanic sensor, an Alpha & Beta brainwave sensor and a Fountain of Youth sensor.

5. The device of claim 4, wherein the alerting mechanism further comprises one of an audible alarm, a visual alarm and a physical alarm.

6. A snooze alert system, comprising:
a vehicle;
a snooze alert device installed in the vehicle and being used by a driver of the vehicle;
the snooze alert device having a sleep pattern characteristic sensor adjacent to a driver that generates one or more pieces of sleep pattern characteristic data about the driver, the sleep pattern characteristic sensor further comprising a heart rate monitoring sensor and a breathing sensor that generate heart rate data and breathing data, a computing device connected to the sleep pattern characteristic sensor that receives the one or more pieces of sleep pattern characteristic data, analyzes the heart rate data and the breathing data to determine a sleep pattern of the driver and detects if the sleep pattern of the driver is indicated based on the sleep pattern characteristic data and an alerting mechanism connected to the computing device that generates a sleep pattern alert when the sleep pattern of the driver is detected.

7. The system of claim 6, wherein the computing device further comprises an application executing by a processor of the computing device that receives the one or more pieces of sleep pattern characteristic data and detects if the sleep pattern of the driver is indicated.

8. The system of claim 7, wherein the sleep pattern characteristic sensor further comprises one of a temperature sensor, a galvanic sensor, an Alpha & Beta brainwave sensor and a Fountain of Youth sensor.

9. The system of claim 8, wherein the alerting mechanism further comprises one of an audible alarm, a visual alarm and a physical alarm.

10. A snooze alert method, comprising:
measuring, during driving of a vehicle, a sleep pattern characteristic of a driver of the vehicle, the sleep pattern characteristic including a heart rate of the driver and a respiration rate of the driver;
analyzing the heart rate and the respiration rate of the driver to determine a sleep pattern of the driver;
determining if the sleep pattern is indicated based on the measured sleep pattern characteristics; and
generating a sleep alert to the driver when the sleep pattern is indicated.

11. The method of claim 10, wherein measuring the sleep pattern characteristic further comprises measuring one or more of a temperature, a galvanic measurement and a set of brainwaves.

12. The method of claim 11, wherein generating a sleep alert further comprises generating one of an audible alarm, a visual alarm and a physical alarm.

* * * * *